Dec. 2, 1969   J. A. ORSINO   3,481,791

LIQUID ACTIVATED BATTERY

Filed Oct. 31, 1966

INVENTOR
JOSEPH A. ORSINO
BY
E. J. Berry
ATTORNEY.

United States Patent Office 3,481,791
Patented Dec. 2, 1969

3,481,791
LIQUID ACTIVATED BATTERY
Joseph A. Orsino, Manhattan Beach, Calif., assignor to Electromite Corporation, Redondo Beach, Calif., a corporation of California
Filed Oct. 31, 1966, Ser. No. 590,720
Int. Cl. H01m 21/10
U.S. Cl. 136—113    22 Claims

ABSTRACT OF THE DISCLOSURE

A deferred action battery comprising a fluid-proof casing including a dry unactivated electrode assembly and having a sealed, readily frangible glass ampoule containing electrolytic liquid positioned in the promixity thereof, the electrode assembly and sealed glass ampoule being encased within a sealed plastic container. Firing means for breaking the glass ampoule is mounted externally of the sealed plastic container and, upon fracture of the ampoule, the electrolyte solution—which contains a pressurized gaseous medium—will be forced into the electrode assembly, thereby activating the battery regardless of such circumstances as the orientation of the battery or the conditions of gravity or temperature.

---

This invention relates to electrical batteries and refers more particularly to deferred action batteries that are in the dry charged state and are activated by the introduction of liquid electrolyte into the electrode assembly.

For various electrical operations and requirements it is desirable that the batteries be stored in a dry charge, unactivated state for considerable periods of time, and that they incorporate mechanisms or devices for filling them with an electrolyte solution upon demand and for practically instant use. Of particular interest are batteries that are to be used for emergency purposes, such as in sea rescue operations, wherein signal emitting buoys and other life saving devices must be powered. Among these batteries are those that are "water activated" or "sea water activated," the principles of operation of which are well known in the art. In the past, deferred action batteries have been generally unable to maintain their ability and full capacity to generate electrical current after protracted periods of storage in the dry charged state. Efforts to extend the life of the deferred action batteries so as to be economically advantageous have been only partly successful as a result of the constant deterioration of vital parts of the batteries.

To overcome the foregoing and other disadvantages, the present invention provides for a deferred action battery having a practically unlimited storage life in the dry charge state and a novel and unique mechanism for adding liquid electrolyte to the electrodes for instantaneous and efficient battery activation.

Accordingly, it is a primary object of the present invention to provide a deferred action battery having practically unlimited storage life in the dry charge state.

It is a further object of the invention to provide a deferred action battery which may be stored in the dry charge state for extensive periods of time and then activated by a simple mechanical actuating mechanism.

Still another object of the invention is to provide a deferred action battery which may be activated by an electrolyte without releasing poisonous, noxious or corrosive gases and liquids.

Further objects and advantages of the invention will be readily apparent from the following description, taken in conjunction with the accompanying drawings, wherein.

Figure 1:
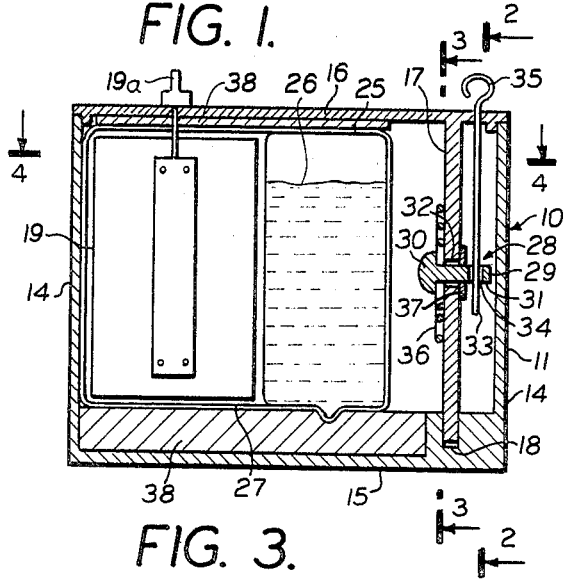
FIG. 1 is an elevational sectional view of a battery assembly according to this invention.
Figure 2:
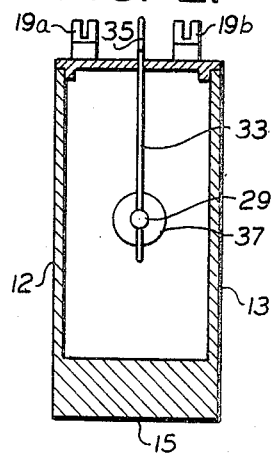
FIG. 2 is a transverse sectional view taken on line 2—2 of FIG. 1.
Figure 3:
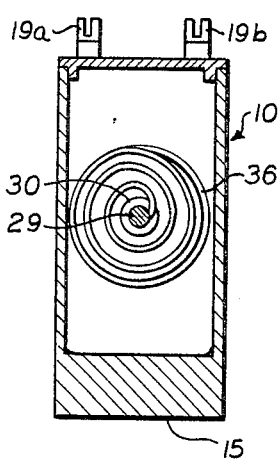
FIG. 3 is a transverse sectional view taken on line 3—3 of FIG. 1.
Figure 4:
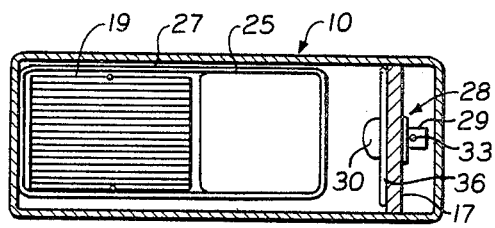
FIG. 4 is a plan sectional view taken on line 4—4 of FIG. 1.
Figure 6:
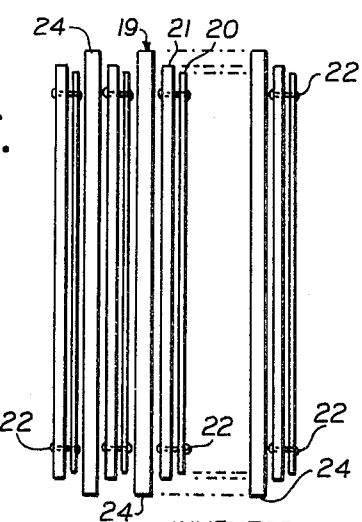
FIG. 6 is a side elevational view, partly in schematic, of the electrode unit shown in FIG. 5.
Figure 5:
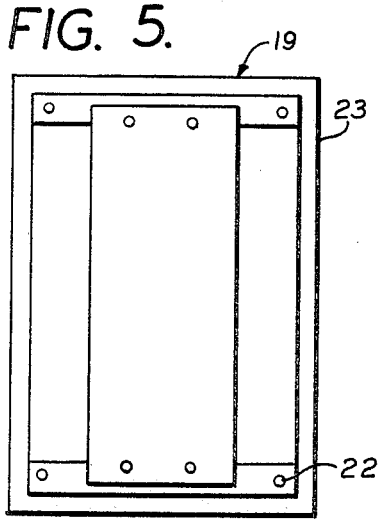
FIG. 5 is an end elevational view of the electrode unit of the battery assembly.

Referring now in detail to the drawings, the battery assembly 10 includes a casing 11, having front and rear walls 12 and 13, end walls 14, and a bottom wall 15. The casing may be formed from a molded plastic, preferably a high impact polystyrene of the type known commercially as ABS which materials are inert to battery acids, and are relatively impervious to the ravages of time and the elements during protracted periods of battery storage.

A battery casing top or cover 16, which may be molded from a similar plastic material, is adapted to provide a close fit with the top of the casing 11. A rib or wall member 17 integrally formed with the under surface of the cover 16 extends into the interior of the casing 11 and the bottom portion engages a groove 18 in the inner surface of bottom wall 15.

A battery plate or electrode assembly 19 is positioned within casing 11 at one end thereof. The electrode assembly is constituted of a plurality of paired silver chloride plates 20 and magnesium alloy plates 21. The paired silver chloride and magnesium alloy plates 20, 21 are fastened together by metallic rivets 22, preferred silver plated or constituted of silver.

Since the electrical current generated upon activation of the battery is caused by the corrosion of the magnesium metal, the utilization of silver or silver plated rivets has been found to be superior to the simple pressure contact between electrode plates heretofore used in the art. The use of silver or silver plated rivets 22 to fasten electrode plates 20, 21, together will result in the generation of uniform steady electrical current. The paired electrode plates 20, 21 are insulated from each other by means of plastic coated tape 23. The positive and negative poles of the electrode assembly 19 are connected in a manner well known in the art through the battery cover 16 to electrical terminals 19a and 19b.

Adjacent electrode pairs 20, 21 are insulated through the interposition of separators 24, which may be cotton felt, absorbent paper, fiber glass, or other non-conductive material.

A sealed glass ampoule 25 is located in the battery casing 11 and positioned in proximity to the electrode assembly 19. Ampoule 25 contains an electrolytic liquid 26 which, when permitted to contact the electrode assembly 19, will activate the battery 10.

The electrolyic liquid 26 preferably comprises a saline solution of sodium chloride dissolved in water, although other salts, such as magnesium chloride or potassium chloride and the like also produce satisfactory operating results.

Although the electrolyte may consist of sea water or an equivalent saline solution containing approximately 1.5% to 3.0% sodium chloride in an aqueous solution, practice has indicated that a 10% aqueous solution of sodium chloride generates a higher voltage and delivers electrical current for considerably longer periods of time than normal sea water. An additional consideration is that the utilization of the higher percentage saline solution depresses the freezing point of the electrolyte, thereby facilitating the activation of the battery 10 at sub-freezing temperatures. If desired, antifreeze liquids, such as alcohol or glycols may be mixed with or used instead of the water in order to still further lower the freezing point of the electrolyte 26.

In order to assure that all or a substantial portion of the electrolyte 26 is dispersed throughout the electrode assembly 19, the ampoule 25 and the electrode assembly 19 are encased in a sealed plastic container or bag 27. The plastic bag 27 may be made of a resilient, laminated polyethylene composition. Prior to activation of the electrode assembly 19 with the electrolyte 26, the sealing of the former into the plastic bag 27 will protect the electrode assembly 19 against moisture which could produce deteriorating effects during extended periods of battery storage.

Activation of the battery 10 is accomplished through a novel actuating device 28. The actuating device 28 includes a firing pin 29 having an enlarged hemi-spherical head portion 30 and an elongated shank portion 31. The shank portion 31 is preferably of a cylindrical configuration and extends through an aperture 32 provided in wall member 17 whereby head portion 30 is positioned facing the plastic bag 27 in proximity to electrolyte-containing ampoule 25.

A pull-pin 33 extends into the battery through suitable opening in cover 16. The pull pin 33 consists of an elongated rod portion engaging the shank portion 31 of firing pin 29 by means of an aperture 34 provided in the latter. The portion of the pull pin 33 projecting externally of the battery may be formed into an eye 35 adapted for manual gripping and actuating, or alternatively, if desired, into a connector for remote or automatic manipulation of the firing pin 29.

The firing pin 29 is maintained in the "cocked" or firing position by a compressed helically-wound coil steel spring 36 which is positioned beneath the shoulder formed by the enlarged head 30 of the firing pin 29 and the surface of wall member 17. The spring 36 is held in the compressed position by the locking action of pull pin 33 on the firing pin 29 and washer 37 encompassing the shank portion 31 intermediate the pull pin 33 and the surface of wall member 17 opposed to the spring 36.

In order to protect the electrode assembly 19 and frangible electrolyte ampoule 25 from damage or destruction during periods of storage and handling prior to activation of the battery 10, portions of the external surface of the plastic bag 27 may be cushioned in a resilient foam material 38, e.g., foamed plastic, sponge rubber or the like.

Activation of the battery is accomplished in the following manner, assuming manual operation:

The eye 35 of pull-pin 33 is pulled away from the battery 10 until its elongated portion interiorly of the battery casing 11 disengages the firing pin 29 upon being withdrawn from aperture 34. This, in effect, removes the restraint from compressed coil spring 36 and permits the latter to exert an accelerating force upon the enlarged head of the firing pin 29. As a result, firing pin 29 is propelled toward resilient plastic bag 27 and frangible glass ampoule 25 with sufficient force to fracture ampoule 25 and release the electrolyte liquid within plastic bag 27. The laminated plastic wall construction of bag 27 should be of sufficient strength to avoid tearing thereof upon impact by the firing pin, thus preventing any loss of the electrolyte liquid and retaining any noxious or poisonous gases generated by the battery activation.

Upon breakage of the ampoule 25, the electrolyte solution 26 saturates the area of the electrode assembly 19, thereby almost instantly activating the battery 10. In view of the possibility that the battery 10 may not be in an upright position where all of the electrolyte solution 26 reaches the electrode plates, the insulating separators 24 are made preferably of an absorbent material whereby a maximum of electrolyte solution is absorbed through capillary action.

In order to assure the forced penetration of the electrode battery plates with electrolyte solution, it may be advantageous to charge the sealed glass ampoule 25 with a small amount of compressed gas, as for example, carbon dioxide or nitrogen. Upon fracture of the ampoule 25, the expanding carbon dioxide gas will force the electrolyte solution into every interstice of electrode assembly 19, thus providing a maximum degree of battery activation in a minimum of time.

Although the battery 10 as described hereinabove has been referred to in connection with the utilization of a saline solution electrolyte, it will be readily obvious to one skilled in the art that other types of electrolytes, such as for example, caustic or acid solutions, may be substituted for the saline solution. Also other electrode plate pairs may be used such as silver-zinc, silver-cadmium, nickel-cadmium, or lead-lead dioxide instead of the silver chloride and magnesium plates.

There has thus been described a novel liquid activated deferred action battery which may be activated by a simple mechanical device and will function at maximum efficiency after long periods of storage without appreciable deterioration. It will be obvious to those skilled in this art that various changes may be made in the invention without departing from the scope and spirit thereof and that the invention is not considered limited by that which is shown in the drawings and described in the specification. Reference therefore, is had to the claims for summaries of the invention and of the novel features of construction and novel combinations of parts for all of which protection is desired.

What is claimed is:

1. A deferred-action battery including a casing having a cover member providing a fluid-tight assembly therewith, a transverse rib extending across the interior of said casing, an electrode assembly in a dry unactivated condition disposed within said casing on one side of said rib, a sealed and readily frangible ampoule containing electrolytic liquid positioned adjacent said electrode assembly, a fluid-tight resilient plastic container within which said electrode assembly and frangible ampoule are sealed, a firing pin for fracturing said ampoule mounted upon said transverse rib and extending therethrough, compressed spring means for moving said firing pin from a cocked to a discharged position, pull pin means located on the opposite side of said transverse rib from said electrode assembly and engaging the firing pin so as to retain said firing pin in cocked position, the construction and arrangement being such that disengagement of said pull pin means from said firing pin will release the firing pin under the urging of said compressed spring means, fracturing the ampoule and releasing the electrolytic liquid only into the resilient plastic container and against the electrode assembly, thereby immediately activating said battery.

2. A deferred-action battery as set forth in claim 1 wherein said compressed spring means is constituted by a helical, flattened coil spring.

3. A deferred action battery as set forth in claim 1 wherein said firing pin is activated through manual manipulation of said pull pin.

4. A deferred action battery as set forth in claim 1 wherein said firing pin is activated through remote automatic manipulation of said pull pin.

5. A deferred action battery as set forth in claim 1 wherein said electrolyte-containing ampoule includes a predetermined quantity of a pressurized gaseous medium adapted to disperse said electrolyte throughout said resilient plastic container upon breakage of said ampoule.

6. A deferred action battery as set forth in claim 5 wherein said pressurized gaseous medium is constituted essentially of carbon dioxide.

7. A deferred action battery as set forth in claim 1 wherein said electrode plates comprise a plurality of paired silver chloride plates and magnesium alloy plates, each pair fastened in back-to-back relationship by means of metallic rivets and insulated from each other through plastic coated tape means.

8. A deferred action battery as set forth in claim 1 wherein said electrode plates comprise a plurality of paired nickel hydroxide and cadmium metal plates.

9. A deferred action battery as set forth in claim 1 wherein said electrode plates comprise a plurality of paired silver oxide and metallic zinc plates.

10. A deferred action battery as set forth in claim 1 wherein said electrode plates comprise a plurality of paired silver oxide plates and metallic cadimum plates.

11. A deferred action battery as set forth in claim 1 wherein said electrode plates comprise a plurality of paired lead dioxide plates and metallic lead plates.

12. A deferred action battery as set forth in claim 7 wherein said metallic rivets are silver plated.

13. A deferred action battery as set forth in claim 7 wherein said metallic rivets are constituted of silver.

14. A deferred action battery as set forth in claim 7 wherein said plate pairs are insulated from adjacent plate pairs by means of absorbent paper adapted to absorb electrolyte through capillary action.

15. A deferred action battery as set forth in claim 7 wherein said electrolyte is constituted essentially of a saline solution.

16. A deferred action battery as set forth in claim 15 wherein said saline solution consists essentially of approximately 10% sodium chloride dissolved in water.

17. A deferred action battery as set forth in claim 15 wherein said saline solution includes one of the salts from the group constituted of sodium chloride, magnesium chloride, or potassium chloride.

18. A deferred action battery as set forth in claim 7 wherein said electrolyte is constituted essentially of a caustic or acid solution.

19. A deferred action battery as set forth in claim 1 wherein said resilient plastic container encompassing said electrodes and frangible ampoule comprises a sealed laminated polyethylene bag.

20. A deferred action battery as set forth in claim 1 including the addition of alcohol or glycerol to said electrolyte solution to adapt said battery for operation at subfreezing temperatures.

21. A deferred action battery as set forth in claim 1 wherein said frangible ampoule consists of glass.

22. A deferred-action battery including a casing having a cover member providing a fluid-tight assembly therewith, a plurality of electrodes in a dry unactivated condition disposed in said casing, a sealed and readily frangible ampoule containing electrolytic liquid positioned adjacent said plurality of electrodes, a substantially fluid-tight resilient plastic container surrounding said readily frangible ampoule and electrodes, a transverse wall member depending from said cover member, the lower extremity of said transverse wall member being received within a groove provided in the inner surface of the bottom wall of said casing, a firing pin mounted upon said wall member and extending therethrough, said firing pin including a head portion for fracturing said ampoule, compressed resilient spring means interposed between said firing pin head portion and said transverse wall member and a pull pin located on the opposite side of said transverse wall member and extending through the battery cover and engaging the extremity of said firing pin remote from said head portion, the construction and arrangement being such that disengagement of said pull pin from said firing pin extremity will release the firing pin under the urging of said compressed resilient spring member, fracturing the frangible ampoule, releasing the electrolytic liquid into the resilient plastic container against the electrodes, thereby immediately activating said battery.

References Cited

UNITED STATES PATENTS

| | | | |
|---|---|---|---|
| 2,050,173 | 8/1936 | Gordon | 136—114.1 |
| 2,433,024 | 12/1947 | Burgess | 136—114 |
| 2,502,723 | 4/1950 | Harriss | 136—113 |
| 2,790,893 | 4/1957 | Lane | 136—114 |
| 2,847,494 | 8/1958 | Jeannin | 136—114 |
| 2,918,515 | 12/1959 | Lawson | 136—114 |
| 2,935,547 | 5/1960 | Kordesch | 136—114 |
| 3,053,928 | 9/1962 | Hopkins | 136—90 |
| 3,148,090 | 9/1964 | Saslow | 136—90 |
| 3,169,891 | 2/1965 | Streigle | 136—114 |
| 3,304,202 | 2/1967 | Sam | 136—114 |
| 3,352,717 | 11/1967 | Burant et al. | 136—90 |
| 3,332,803 | 7/1967 | Tamminen | 136—90 |
| 3,343,994 | 9/1967 | Stanimirovitch | 136—90 |
| 3,346,420 | 10/1967 | Snyder | 136—90 |

WINSTON A. DOUGLAS, Primary Examiner

C. F. LEFEVOUR, Assistant Examiner

U.S. Cl. X.R.

136—90